Oct. 26, 1971
T. O. PAINE
ADMINISTRATOR OF THE NATIONAL AERONAUTICS
AND SPACE ADMINISTRATION
SCREEN PARTICLE SEPARATOR
3,615,021
Original Filed Jan. 24, 1968
2 Sheets-Sheet 1
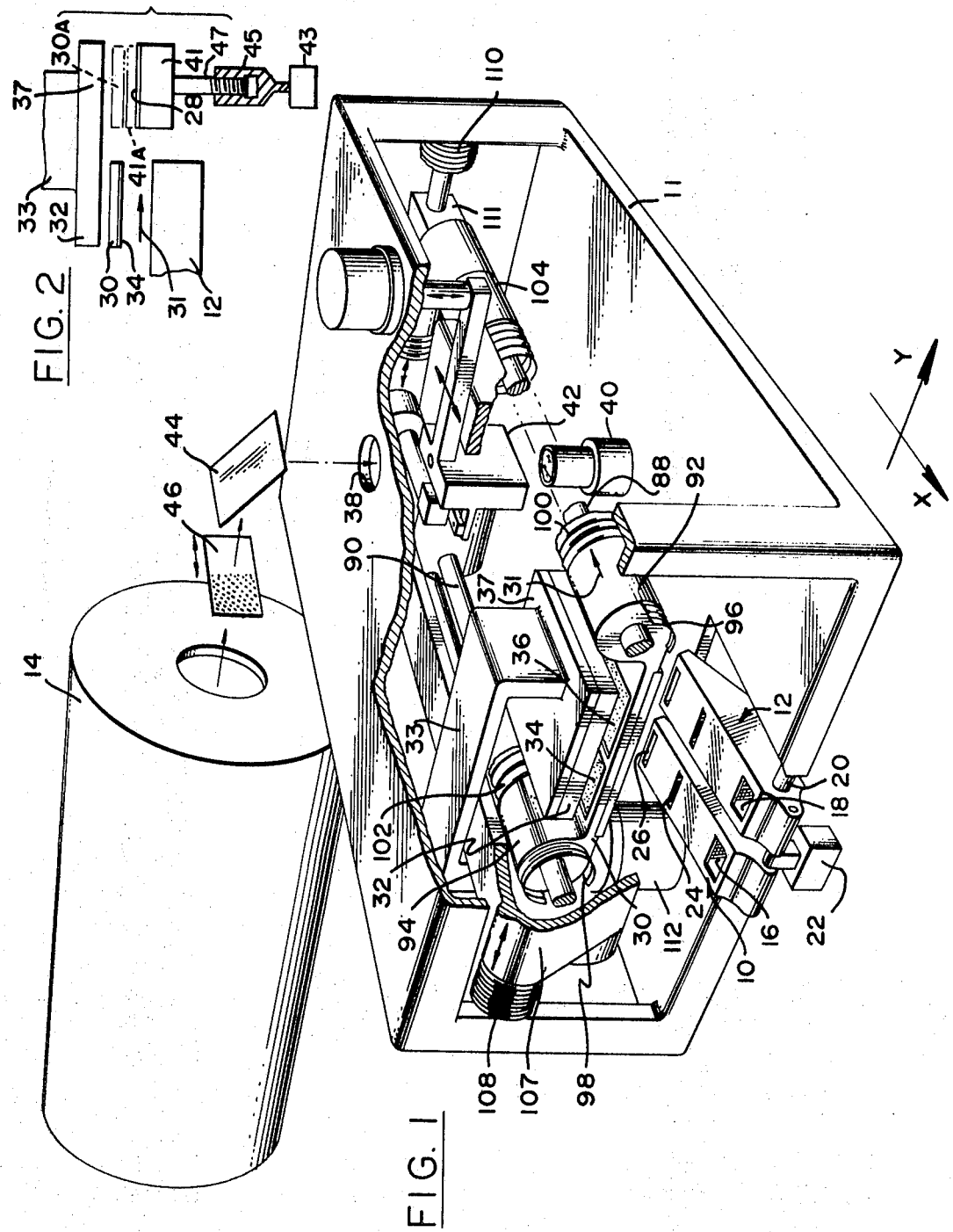
DOUGLAS G. RITCHIE
*INVENTOR.*
BY
ATTORNEYS

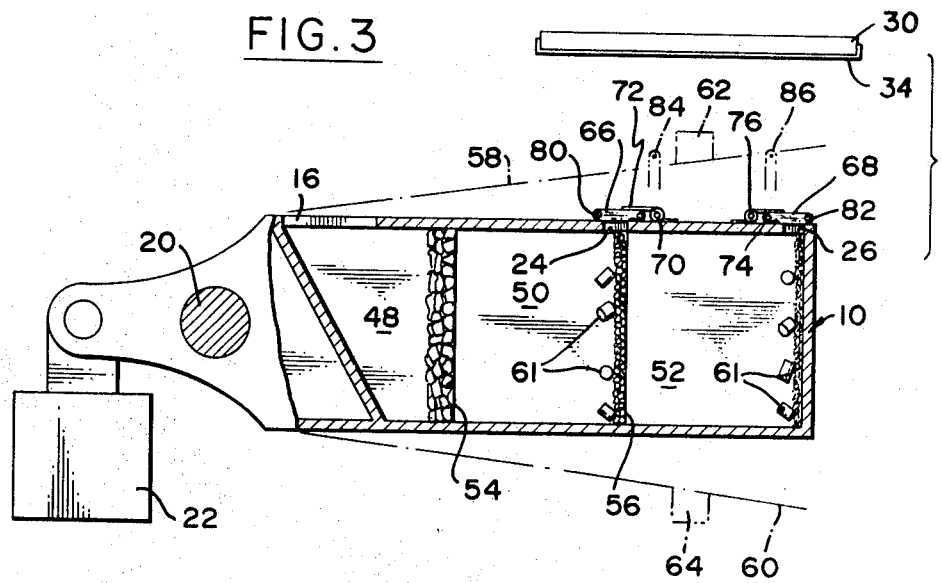

United States Patent Office 3,615,021
Patented Oct. 26, 1971

3,615,021
SCREEN PARTICLE SEPARATOR
T. O. Paine, Administrator of the National Aeronautics and Space Administration, with respect to an invention of Douglas G. Ritchie, Pasadena, Calif.
Original application Jan. 24, 1968, Ser. No. 700,120, now Patent No. 3,472,372, dated Oct. 14, 1969. Divided and this application Oct. 6, 1969, Ser. No. 864,039
Int. Cl. B07b 1/28
U.S. Cl. 209—349
1 Claim

ABSTRACT OF THE DISCLOSURE

A mechanism useful in an unmanned spacecraft for screening a soil sample to obtain particles for television viewing. The mechanism comprises a bin for receiving the soil sample, apparatus for rapidly oscillating the bin about a pivot to create centrifugal forces pushing the soil particles through coarse and fine screens, a heated plastic sheet for receiving particles thrown out of the bin, and a translating mechanism for carrying the plastic to a vidicon tube for television observation of the particles. The translating mechanism includes slides which move along rods, each rod hermetically enclosed within a bellows to prevent the evaporation of lubricants when operated in a vacuum environment such as exists on the moon.

CROSS-REFERENCE TO RELATED APPLICATIONS

This is a division of patent application Ser. No. 700,120 filed Jan. 24, 1968, now U.S. Pat. No. 3,472,372.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to apparatus for separating particles by passage through screens.

One important phase in the exploration of the moon and of other planets by unmanned spacecraft involves the identification of soil compositions. Mechanisms for gathering up a soil sample are easily designed, but the separation of the sample into particles for observation is difficult. While the sample could be sifted through screens, gravity is insufficient on the moon, and some planets, to force the sample through the screen. Moreover, in a vacuum environment the particles have a tendency to stick together and to a screen. In addition to the problems of separating out the particles, difficulties are encountered in the gathering of separated particles so that they can be readily viewed by a television camera or the like.

OBJECTS AND SUMMARY OF THE INVENTION

Accordingly, one object of the present invention is to provide apparatus for enabling the viewing of particles in a sample of material, which operates in a vacuum and low-gravity environment.

Another object is to provide apparatus for separating and screening particles which provides high forces tending to separate the particles and tending to push the particles through a screen.

Yet another object is to provide apparatus for encapsulating particles for television viewing.

Still another object is to provide a mechanism for enabling the sliding of a stage while maintaining the sliding mechanism in a sealed atmosphere.

The present invention provides a mechanism for separating soil samples by unmanned spacecraft, including a bin for receiving soil samples and a mechanism for pivotally oscillating the bin so that particles pass through coarse and fine screens into various bin chambers. The oscillation of the bin occurs about an axis to set up centrifugal forces pushing the particles through the screens. Bumpers are provided for suddenly stopping the bin at its extremes of pivoting to provide tangential shocks that separate the particles and prevent their adhesion in a vacuum environment. In addition, large pellets are included in the bin chambers to keep the particles "stirred up." After several minutes of vibrations, slots in the bin chambers are opened and the bin is oscillated to cause the coarse and fine particles to be thrown out of the bin.

The particles thrown out of the bin through the slots are captured by a preheated plastic sheet placed near the slots. After sufficient particles have been deposited on the plastic sheet, another sheet is pressed against the deposited particles to securely encapsulate them. The capsule is then moved under a vidicon tube for enabling television viewing of the coarse and fine particles, which lie on different parts of the plastic sheet.

The stage which holds the plastic sheets slides a considerable distance from the position above the bins to a position under the vidicon tubes. The sliding mechanism must be protected again the vacuum environment yet must allow the stage to slide a considerable distance. To protect the sliding mechanism, two bellows are provided which seal the sliding mechanism against the ambient atmosphere. One bellows extends between the vidicon camera position and the stage and is collapsed as the stage moves toward the vidicon camera, while the other bellows extends between the bin positions and the stage for expanding as the stage moves toward the vidicon camera.

A more complete understanding of the invention may be had by considering the following specification and claim when taken in conjunction with the accompanying drawings.

BRIEF DESCRIPTION OF THE DRAWINGS

FIG. 1 is a broken isometric view of a particle separator constructed in accordance with the invention;

FIG. 2 is a partial side elevation view of the encapsulation mechanism of the particle separator of FIG. 1;

FIG. 3 is a side elevation of a bin of the particle separator of FIG. 1; and

FIG. 4 is a partial pictorial view of the translation mechanism of the particle separator of FIG. 1.

DESCRIPTION OF THE PREFERRED EMBODIMENTS

FIG. 1 illustrates one embodiment of the invention for receiving soil samples in bins 10 and 12 and enabling the viewing of particles of the samples by a vidicon camera 14. The apparatus is generally a portion of a spacecraft landed on an extraterrestrial body, such as the moon, and the soil samples are provided by a mechanical arm (not shown) which scoops up some of the ground area and deposits it in one of the bins through an opening 16 or 18 therein. The bins are pivotally mounted on a separator housing 11 by a flexure support 20 and are vibrated about this support by a vibrator solenoid 22. The vibration about the flexure support 20 causes particles in the soil sample to pass through screens in the bin. After a sample has been deposited in one of the bins, such as bin 10, and the bins have been vibrated for several minutes to separate the particles, covers (shown in FIG. 3) over slots 24 and 26 are opened. The bins are then vibrated for a short period of time to throw out the particles through the slots 24 and 26 onto a heated plastic receiving sheet 34 which captures the particles.

The plastic receiving sheet 34 is positioned on the bottom of a slide stage 30. The slide stage 30 is initially positioned below a heating plate 32, which is held on a clamp 33. The heating plate 32 heats the sheet 34 to a tacky consistency immediately prior to removal of covers on the slots 24 and 26. The sheet 34 is positioned to receive the particles emerging from the slots, and these particles stick to the heated plastic. After particles have been thus deposited on the sheet, the slide stage 30 is moved in the direction of the arrow 31 until it is beneath the end portion 37 of the clamp 33. At this position, an encapsulating sheet is applied to the receiving sheet 34.

FIG. 2 is a partial view of the mechanism of FIG. 1, showing the apparatus for encapsulating particles held on the receiving sheet 34. After the sheet receives the particles, the slide stage 30 on which the sheet is held is moved to the position shown at 30A. A lower clamp 41 which holds an encapsulating sheet 28, is located below the slide stage in its position at 30A. The lower clamp 41 includes a heater for heating the encapsulating sheet 28 to a tacky consistency. After the sheet 28 has been thus heated, the lower clamp 41 is moved upwardly toward the slide stage 30A by a motor 43 that rotates a nut 45 on its shaft to advance a screw 47 fixed to the clamp 41. In the position at 41A, the lower clamp holds the heated encapsulating sheet 28 against the receiving sheet 34 to encapsulate the particles held thereon. The lower clamp 41 is then moved down again. Thereafter, the slide stage 30 is moved in the direction of the arrow 31 toward a viewing station 38, shown in FIG. 1.

At the viewing station 38, the capsule formed by a portion of the plastic encapsulating sheet 28 and the sheet 34 is brought between an illuminator 40 and a lens system 42. Light passing from the illuminator 40 through the capsule and the lens assembly 42 passes through a hole at the viewing station 38, is deflected by a mirror 44, passes through an analyzer/neutral density filter 46 and enters an opening in the vidicon camera 14. An image of the particles is converted to electrical signals by the vidicon camera 14, delivered to a transmitter, and transmitted to receiving stations on the earth.

FIG. 3 is a side sectional view of the bin 10 of FIG. 1. The bin comprises an elongated chamber separated into a first compartment 48 for receiving soil samples through the opening 16, a second chamber 50 for receiving coarse particles of less than a predetermined size from the first chamber 48, and a third chamber 52 for receiving fine particles from the second chamber 50. A coarse screen 54 separates the first and second chambers and a fine screen 56 separates the second and third chambers. The bin is pivotally mounted at 20 by reason of attachment to a flexure support at 20. Slots 24 and 26, located on a side of each screen 54 and 56 which is opposite to the pivot point 20, enable the exhaustion of particles. The slots 24, 26 are elongated openings that extend along the particle stopping means formed by screen 56 or the far wall of chamber 52, to facilitate the exhaust of all particles in the chambers.

When the bin is vibrated by the vibrator solenoid 22, it oscillates about the flexure support 20 by plus and minus 8° from its center position, taking the extreme position defined by the lines 58 and 60. Bumpers 62 and 64 attached to the separator housing limit movement of the bin between these extreme positions, and also serve to stop the bin abruptly at its extreme positions, by contacting the upper and lower walls of the bin. The rapid oscillations about flexure support 20, such as 20 cycles per second for a bin 10 which is three inches long, with a maximum arc of ¾ inch, provides a centrifugal force which peaks at 7 g. This force causes particles to move through the corase and fine screens 54 and 56 with considerable impetus. Additionally, the abrupt stopping of the pivoting by the bumpers 62 and 64 results in large tangential accelerations, resulting in the particles moving violently back and forth across the screen and facilitating their separation in spite of bonding action which often occurs in a vacuum environment.

In order to further facilitate particle separation, pellets 61 are initially included in both chambers 50 and 52. The pellets 61 are included to stir up the particles in each bin to prevent their sticking together, and to dislodge particles which stick to a screen to keep the screens cleared. The pellets are short cylinders constructed of the same plastic used for the receiving sheets 34 and 36 and for the encapsulating sheet 28. Thus, any dust from the pellets does not contaminate the particles, since such dust melts into the heated plastic sheets. The pellets 61 are large enough so that they do not move through the screen 56 or the slots 24 and 26 in the bin.

During the first period of vibration of the bin 10, after deposition of a particle sample in the first chamber 48, covers 66 and 68 disposed over the slots 24 and 26 are closed. The cover 66 is pivotally attached at 70 to a hinge fixed to the bin 10. A spring 72 having one end attached to the bin 10 and the other end attached to the cover 66, tends to spring open the cover 66 to uncover the slot. Similarly, cover 68 is pivoted at 74 and spring-biased toward an open position by spring 76. Pins 80 and 82 hold the covers to protuberances on the bin, to keep the covers closed. A solenoid (not shown) pulls the pins 80 and 82 to release the covers 66 and 68 and allow them to spring to an open poistion shown by dotted lines at 84 and 86. Hinged covers are shown to maintain a minimum of friction in springing open, but slidable covers could be used instead.

After the sample has been deposited into first chamber 48, and the bin 10 has been vibrated for a sufficient time, such as several minutes, to allow particles to sift through the coarse and fine screens, the solenoid operating the pins 80 and 82 is operated. Thereupon, the covers 66 and 68 fly open. Further vibration of the bin by the solenoid 22 causes the coarse and fine particles to be projected out of the openings 24 and 26 in the bin. The plastic film 34 positioned above the bin, receives the particles, and, due to its tacky nature from heating by the heating plate 32, holds the particles. The slide stage 30 can then be moved to the end position 37 of the clamp assembly for encapsulation.

The translation of the slide stage between the heating plate 32 and viewing station 38 involves considerable movement. The slide stage 30 is guided by guide shafts 88 and 90 which extend between guide shaft supports 107 and 111. The guide shafts 88 and 90 are positioned within slide bearings 92 and 94, and the bearings are attached to the slide stage 30. In order to facilitate movement of the slide bearings 92 and 94 along the guide shafts 88 and 90, lubrication is provided between them. In a vacuum environment such lubrication is likely to evaporate and the slide bearings are likely to seize on the guide shaft and not move. To prevent this, a hermetically sealed environment is provided about the guide shafts 88 and 90.

The area about the guide shafts 88 and 90 is hermetically sealed by means of bellows. Two bellows 96 and 98 extend between the slide bearings 92 and 94 and the guide shaft support 107 nearest the bins. Another pair of bellows 100 and 102 extends between the slide bearings 92 and 94 and the guide shaft support 111 adjacent to the viewing station 38. When the slide stage 30 is under the heating plate 32, the bellows 96 and 98 are in their fully collapsed position, while the bellows 100 and 102 are fully extended. When the slide stage 30 is at the viewing station 38, the bellows 96 and 98 are fully extended and the bellows 100 and 102 are fully collapsed. In all positions, the bellows reliably seal the area about the guide shafts 88 and 90, which they cover. This sealing is reliable inasmuch as it does not depend upon sliding seals which readily develop leaks.

A better view of the guide shafts 88 and 90 and the four bellows disposed thereabout is provided in FIG. 4. The slide stage 30 is moved by a drive motor 104 which turns the guide shaft 88. Threads on the guide shaft 88 allow it to function as a lead screw. A ball bearing nut 93 on the slide bearing 92 engages the threads on the shaft 88 so that the slide stage moves as the motor turns. Thus, the housing 11 defines three stations, located at the area near the bins, the area at the vidicon camera, and the intermediate area where encapsulation occurs. The rods 88 and 90 serve as means for guiding the slide between the stations. The bellows, including one pair extending between the vidicon station area of the housing and the slide, and the other extending between the station near the bins and the slide stage, hermetically seal the area about the rods.

In addition to movement between a location under the heating plate 32 and the viewing station 38, the slide stage 30 is required to move laterally to enable the bringing of many portions of the capsule in line with the field of view of the vidicon camera 14.

In the particle separator shown in FIG. 1, two bins are provided to enable the viewing of two separate soil samples. Each of the bins 10 and 12 may be filled with a soil sample, both of the bins vibrated, particles thrown from both bins onto the plastic sheets 34 and 36 at the same time, and the two sheets encapsulated by an encapsulating film 28 at the same time.

The sequence of operations can be controlled by a set of cams that are rotated by a timing motor to close switches that operate the solenoid 22 for the screening operation, the drive motor 104 for moving the slide stage, the motor 43 for operating the clamp, and so forth. Such timing motors are well known in the art, being used extensively in operating automatic washing machines and other household and industrial items. Alternatively, a human operator can send signals to a receiver at the particle separator to close switches that control energization of solenoids and motors, to thereby control the sequence of operations.

While a particular embodiment of the invention has been illustrated and described, it should be understood that many modifications and variations may be resorted to by those skilled in the art, and the scope of the invention is limited only by a just interpretation of the following claim.

What is claimed is:
1. A particle separator comprising:
bin means for receiving a sample;
means for pivotally supporting said bin means;
a first screen within said bin means for regulating the passage of particles therethrough, said screen extending in a direction substantially circumferentially about the axis of pivoting of said bin means;
a second screen positioned within said bin means and spaced from said first screen on a side thereof opposite said pivot point, to form a chamber between said first and second screens;
oscillating means coupled to said bin means for pivoting said bin means back and forth about its axis of pivoting at a speed great enough to urge particles in said bin means against said first screen primarily by centrifugal forces;
bumper means disposed on opposite sides of said bin means to abruptly halt pivoting of said bin means; and
walls forming an opening in said chamber for exhausting particles that have passed through said first screen, whereby to supply particles of a size in between the sizes that can pass through said first screen and said second screen.

References Cited

UNITED STATES PATENTS

| | | | |
|---|---|---|---|
| 392,023 | 10/1888 | Heming | 209—389 X |
| 1,025,290 | 5/1912 | New | 209—336 |
| 1,566,036 | 12/1925 | Nuchtshein | 209—372 X |
| 2,208,077 | 7/1940 | Linke | 209—326 X |
| 2,395,138 | 2/1946 | Nicholls | 209—381 X |
| 3,123,552 | 3/1964 | Lowry | 209—326 |
| 1,189,961 | 7/1916 | Johnson | 209—269 X |
| 2,734,537 | 2/1956 | Geisler | 209—275 X |

FOREIGN PATENTS 844,507   4/1939   France.

FRANK W. LUTTER, Primary Examiner

R. HALPER, Assistant Examiner

U.S. Cl. X.R.

209—311, 360, 373